(12) United States Patent
Niemuth

(10) Patent No.: US 8,411,363 B2
(45) Date of Patent: Apr. 2, 2013

(54) PLASTIC SHEETS WITH LENTICULAR LENS ARRAY

(75) Inventor: Todd R. Niemuth, Oostburg, WI (US)

(73) Assignee: Spartech Corporation, St. Louis, MO (US)

( * ) Notice: Subject to any disclaimer, the term of this patent is extended or adjusted under 35 U.S.C. 154(b) by 146 days.

(21) Appl. No.: 12/582,365

(22) Filed: Oct. 20, 2009

(65) Prior Publication Data

US 2010/0195210 A1    Aug. 5, 2010

Related U.S. Application Data

(63) Continuation of application No. 11/731,697, filed on Mar. 29, 2007, now Pat. No. 7,609,450.

(51) Int. Cl.
     *G02B 27/10* (2006.01)
(52) U.S. Cl. ......... 359/619; 359/618; 359/620; 359/628
(58) Field of Classification Search .................. 359/619, 359/620, 628
See application file for complete search history.

(56) References Cited

U.S. PATENT DOCUMENTS

| | | | |
|---|---|---|---|
| 5,362,351 A | 11/1994 | Karszes | |
| 5,365,294 A | 11/1994 | Anderson | |
| 5,460,679 A | 10/1995 | Abdel-Kader | |
| 5,488,451 A | 1/1996 | Goggins | |
| 5,532,786 A | 7/1996 | Hassall et al. | |
| 5,600,388 A | 2/1997 | Anderson | |
| 5,699,190 A | 12/1997 | Young et al. | |
| 5,812,152 A | 9/1998 | Torigoe et al. | |
| 5,896,230 A | 4/1999 | Goggins | |
| 6,119,751 A | 9/2000 | Nilsen et al. | |
| 6,120,636 A | 9/2000 | Nilsen et al. | |
| 6,310,722 B1 | 10/2001 | Baek | |
| 6,322,735 B1 | 11/2001 | Yamaki et al. | |
| 6,381,071 B1 | 4/2002 | Dona et al. | |
| 6,424,467 B1 | 7/2002 | Goggins | |
| 6,596,361 B2 | 7/2003 | Klein et al. | |
| 6,624,946 B2 | 9/2003 | Franko, Sr. | |
| 6,869,548 B2 | 3/2005 | Matsumoto | |
| 6,877,973 B2 | 4/2005 | Matsumoto et al. | |
| 6,943,953 B2 | 9/2005 | Raymond | |
| 6,993,242 B2 | 1/2006 | Winston et al. | |
| 6,995,914 B1 | 2/2006 | Conley et al. | |
| 7,002,748 B1 | 2/2006 | Conley et al. | |
| 7,119,963 B1 * | 10/2006 | Cassara | 359/619 |
| 2005/0286134 A1 | 12/2005 | Goggins | |
| 2008/0002105 A1 | 1/2008 | Park et al. | |
| 2008/0030864 A1 * | 2/2008 | Gougeon et al. | 359/619 |
| 2008/0112057 A1 | 5/2008 | Ono et al. | |
| 2009/0303603 A1 * | 12/2009 | Goggins | 359/628 |

* cited by examiner

*Primary Examiner* — Scott J Sugarman
*Assistant Examiner* — Mahidere Sahle
(74) *Attorney, Agent, or Firm* — Armstrong Teasdale, LLP

(57) ABSTRACT

A lenticular sheet, in one exemplary embodiment, includes a first surface having at least two portions, an opposing second surface, and a plurality of lenticular lenses formed in the first surface. Each portion of the first surface includes a number of lenticular lenses per centimeter that is different from the number of lenticular lenses per centimeter of an adjacent portion of the first surface.

27 Claims, 8 Drawing Sheets

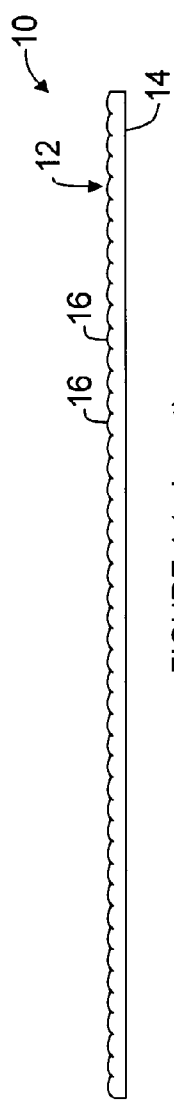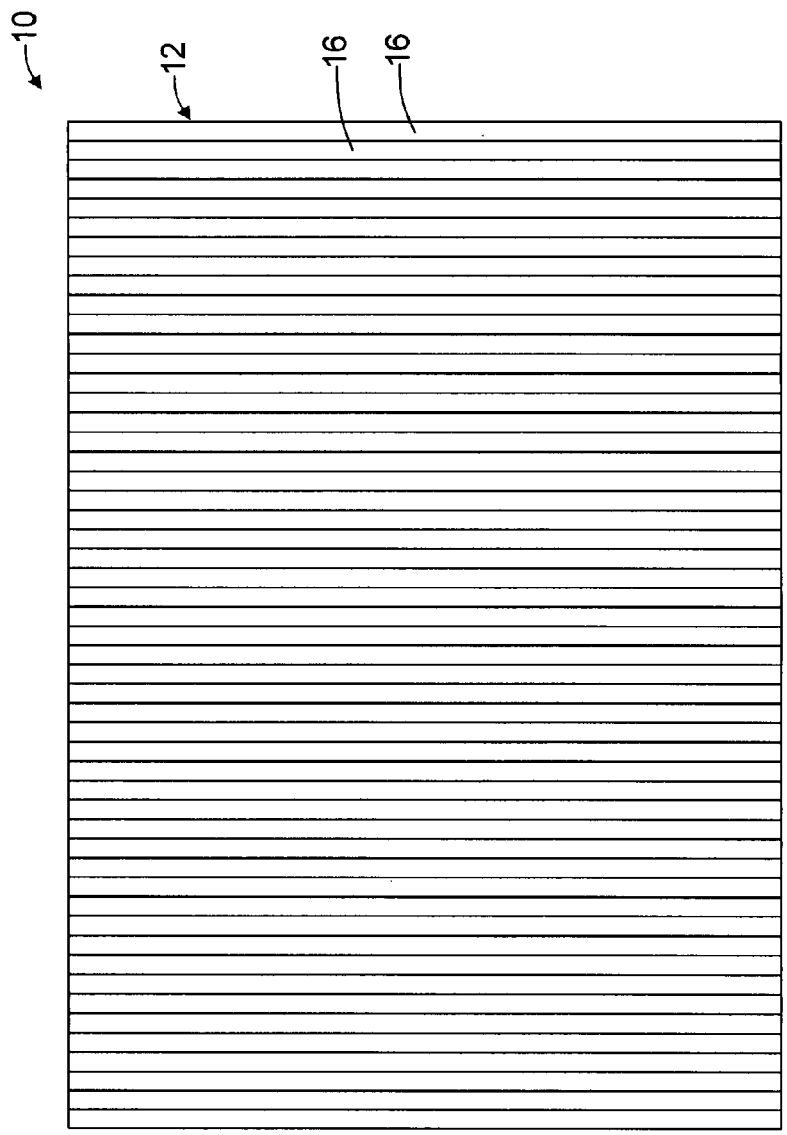
FIGURE 1 (prior art)
FIGURE 2 (prior art)

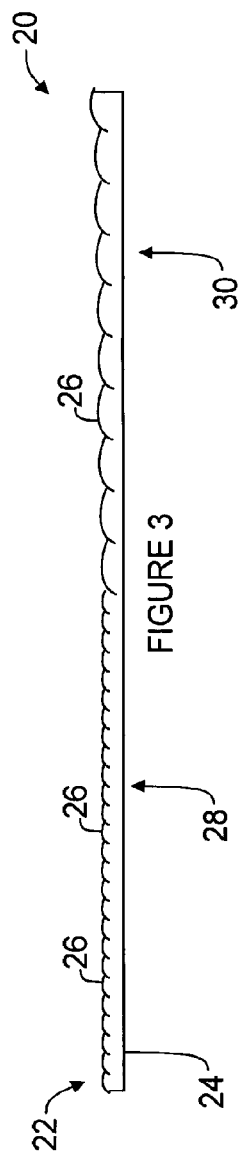
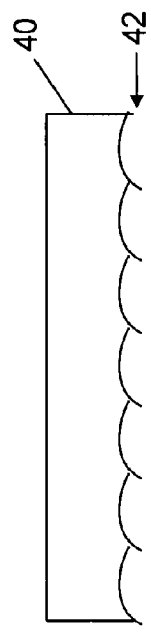
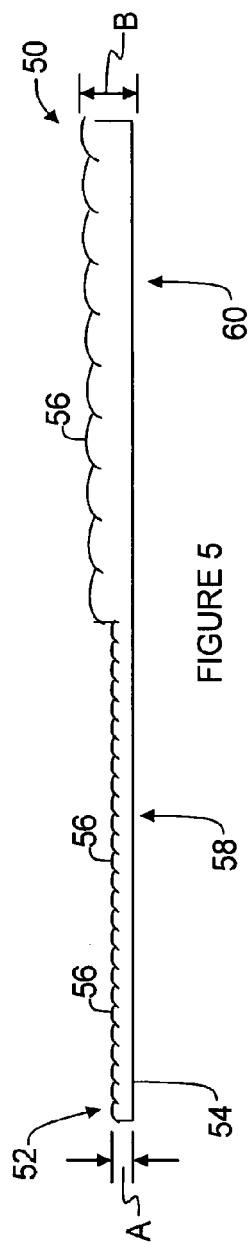

PLASTIC SHEETS WITH LENTICULAR LENS ARRAY

CROSS REFERENCE TO RELATED APPLICATIONS

This application is a Continuation of U.S. patent application Ser. No. 11/731,697 filed Mar. 29, 2007 now U.S. Pat. No. 7,609,450.

BACKGROUND OF THE INVENTION

This invention relates generally to lenticular sheets, and more particularly to lenticular sheets having varying lenticular arrays and methods of manufacturing these lenticular sheets.

It is often desirable to impart visual effects such as three dimensionality or motion characteristics upon packages or labels of consumable products and the like. Regular print advertising is accomplished by printing, two-dimensional, non-movable information using words and pictures or graphics on packaging, labels, magazines, newspapers, brochures, fliers, posters, billboards, and signs. One purpose of an advertisement in packaging is to attract the attention of the reader or customer and convey the desired information. The use of products ad packaging having lenticular effects has become increasingly popular.

A reverse printed lenticular sheet presents an image that has depth, morphing characteristics, and/or can appear to have movement or the capability to flip from one image to another. Also, a lenticular sheet having a clear surface offers additional protection to the print on the reverse side from environmental hazards.

Known lenticular lenses, or micro lenses, are typically elongated, lineal or dot patterned across a transparent sheet or web such that an image is seen through the sheet with the desired visual effect. The lenses typically are either convex or concave in configuration, but can also be elliptical in shape. Typically, the lenses have a pre-determined radius of curvature and a pre-determined uniform pitch or repeat pattern. Lenticular sheets include lenticular lenses that are thin, transparent lenses that are flat on one side and include a plurality of parallel, linear, side-by-side lenticules on a second side. Typically, an image is printed on the flat side to create a visual effect of zoom-in, zoom-out, steroscoping, three-dimensional sequencing, or movement of the image when viewed through the lenticules on the opposing side.

Typically, a pre-formed lenticular lens material is utilized for production of labels having the 3D or motion effect. Lenticular lens material, as known in the art, utilizes rows of simple and commonly dome-shaped lenses or "lenticules", in combination with a lineform or interlaced image, to create a 3D or motion illusion. The lens material is, for the most part, optically clear, and has a flat side and a "lenticulated" side comprising the lenticules. The lineform or interlaced image comprises image segments oriented into contiguous juxtaposed rows. These image segments are typically created on a base material, such as paper, film, or the like. The image segments are specifically designed to correspond to the lenticules of the lens material, and vice-versa. The flat side of the lens material is secured against the segmented image at an orientation where the lenticules are in alignment with the image segments. When the image is then viewed through the lenticulated side of the lens material, a visual 3D or motion illusion results.

BRIEF DESCRIPTION OF THE INVENTION

In one aspect, a lenticular sheet is provided. The lenticular sheet includes a first surface having at least two portions, an opposing second surface, and a plurality of lenticular lenses formed in the first surface. Each portion of the first surface includes a number of lenticular lenses per centimeter that is different from the number of lenticular lenses per centimeter of an adjacent portion of the first surface.

In another aspect, a method of manufacturing a lenticular sheet is provided. The method includes the steps of providing an optically clear plastic substrate sheet having a first surface and an opposing second surface with the first surface having at least two portions, and forming a plurality of lenticular lenses in the first surface so that each portion of the first surface includes a number of lenticular lenses per centimeter that is different from the number of lenticular lenses per centimeter of an adjacent portion of the first surface. Further, the step of forming a plurality of lenticular lenses includes contacting the first surface of the substrate sheet with an embossing device having a negative pattern of the plurality of lenticular lenses.

In another aspect, a lenticular lens embossing device is provided. The lenticular lens embossing device includes an engagement member having an outer surface that includes at least two portions, and a negative of a pattern of lenticular lenses engraved into the outer surface of said engagement member. The pattern of lenticular lenses includes an arrangement where each portion of the outer surface of said engagement member includes a number of lenticular lenses per centimeter that is different from a number of lenticular lenses per centimeter of an adjacent portion of the outer surface.

BRIEF DESCRIPTION OF THE DRAWINGS

FIG. 1 is a face view schematic illustration of a known lenticular sheet having a single pattern of lenticular lenses.

FIG. 2 is an edge view schematic illustration of the lenticular sheet shown in FIG. 1.

FIG. 3 is an edge view schematic illustration of a lenticular sheet in accordance with an exemplary embodiment of the present invention.

FIG. 4 is a sectional schematic illustration of an embossing device.

FIG. 5 is an edge view schematic illustration of a lenticular lens in accordance with another exemplary embodiment of the present invention.

DETAILED DESCRIPTION OF THE INVENTION

Figure 6:
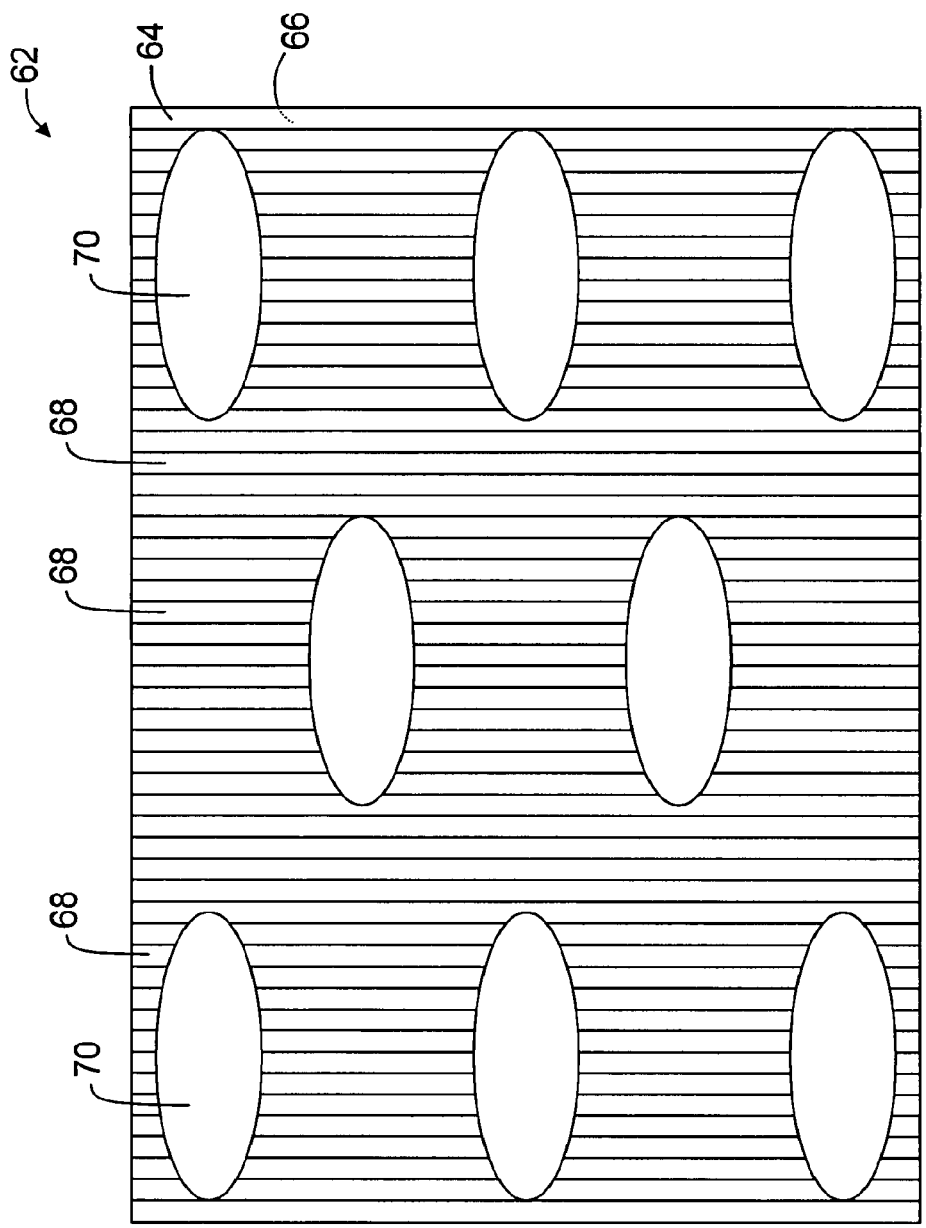
FIG. 6 is a face view schematic illustration of a lenticular sheet in accordance with another exemplary embodiment of the present invention.

Lenticular sheets having various lenticular lens patterns, or arrays, and methods of forming these lenticular sheets are described below in detail. The methods include using an embossing device, for example a cylinder or a plate, that includes a negative of the desired lenticular patterns to be embossed onto a surface of a sheet of clear plastic. In one embodiment, the clear plastic is extruded as a web, embossed with the lenticular lens patterns, and then cut to a desired size. In another embodiment, individual plastic sheets are heated and then embossed with the desired lenticular lens patterns. These methods provide for high volume output and can eliminate secondary processing for the production of individual articles formed from the lenticular sheets, for example, greeting cards, cups, juice boxes, and other similar containers.

Referring to the drawings, FIG. 1 is a face view schematic illustration of a known lenticular sheet 10 having a single pattern of lenticular lenses. FIG. 2 is an edge view schematic illustration of sheet 10. Referring to FIGS. 1 and 2, lenticular sheet 10 includes a first surface 12 and an opposing second surface 14. A plurality of lenticular lenses 16 are formed in first surface 12 of lenticular sheet 10. Second surface 14 is flat so as to receive a printed image which when viewed through lenticular lenses 16 of first surface 12 can produce a visual effect depicting depth, morphing characteristics, and/or can appear to have movement or the capability to flip from one image to another.

FIG. 3 is an edge view schematic illustration of a lenticular sheet 20 in accordance with an embodiment of the present invention. Lenticular sheet 20 has a first surface 22 and an opposing second surface 24. A plurality of lenticular lenses 26 are formed in first surface 22 of lenticular sheet 20. First surface 22 includes a first portion 28 and a second portion 30 adjacent to first portion 28. The number of lenticular lenses per unit length in first portion 28 is different than the number of lenticular lenses per unit length in second portion. In the exemplary embodiment the number of lenticular lenses per centimeter (cm) in first portion 28 is greater than the number of lenticular lenses per cm in second portion 30. In alternate embodiments, first surface 22 includes more than two portions. Lenticular lenses 26 can be any suitable shape, for example, conically shaped, spherically shaped, triangularly shaped, and can be concave or convex. In the exemplary embodiment, lenticular lenses are substantially parallel to each other. In alternative embodiments, lenticular lenses 26 can be at any opposing angle to each other including being perpendicular to each other.

Referring also to FIG. 4, lenticular lenses 26 are formed in first surface 22 using an embossing device 40. In the exemplary embodiment, embossing device 40 has a cylinder shape and has a negative 42 of the lenticular pattern that is embossed onto first surface 22 of sheet lenticular 20. In an alternate embodiment, embossing device is a plate that has a negative of the lenticular lens pattern formed on lenticular sheet 20. In one embodiment, plastic material is extruded as a web, embossed with the lenticular lens patterns by contacting the web with embossing device 40, and then cutting the web to a desired size to form lenticular sheet 20. In another embodiment, individual plastic sheets are heated and then embossed with the desired lenticular lens patterns.

Lenticular sheet 20 can be formed from any suitable thermoplastic resin(s). Suitable thermoplastic resins include, but are not limited to, polyester resins, for example polyethylene terephthalate, acrylic resins, polycarbonate resins, olefin resins, for example polypropylene and polyethylene, styrene resins, polylactic acid (PLA) resins, polyhydroxyalkonoate (PHA) resins, aliphatic aromatic polyester (AAP) resins, and mixtures thereof. In one embodiment, the acrylic resin is formed by polymerizing an alkyl (meth)acrylate monomer. The acrylic resins can be copolymers of one or more alkyl esters of acrylic acid or methacrylic acid having from 1 to 20 carbon atoms in the alkyl group optionally together with one or more other polymerizable ethylenically unsaturated monomers. Suitable alkyl esters of acrylic acid or methacrylic acid include methyl (meth)acrylate, isobutyl (meth)acrylate, alpha-methyl styrene dimer, ethyl (meth)acrylate, n-butyl (meth)acrylate, and 2-ethylhexyl (meth)acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. It should be noted that the term "(meth)acrylate" refers to both methacrylate and acrylate.

FIG. 5 is an edge view schematic illustration of a lenticular sheet 50 in accordance with an embodiment of the present invention. Lenticular sheet 50 has a first surface 52 and an opposing second surface 54. A plurality of lenticular lenses 56 are formed in first surface 52 of lenticular sheet 50. First surface 52 includes a first portion 58 and a second portion 60 adjacent to first portion 58. The number of lenticular lenses per unit length in first portion 58 is different than the number of lenticular lenses per unit length in second portion. In the exemplary embodiment the number of lenticular lenses per cm in first portion 58 is greater than the number of lenticular lenses per cm in second portion 60. Also, a thickness A of lenticular sheet 50 corresponding to first portion 58 is less than a thickness B of lenticular sheet corresponding to second portion 60. In another embodiment, thickness A of lenticular sheet 50 corresponding to first portion 58 is greater than thickness B of lenticular sheet corresponding to second portion 60.

FIG. 6 is a face view schematic illustration of a lenticular sheet 62 in accordance with another exemplary embodiment of the present invention. Lenticular sheet 62 has a first surface 64 and an opposing second surface 66. A plurality of lenticular lenses 68 are formed in first surface 64 of lenticular sheet 62. A plurality of openings 70 extend through lenticular sheet 62. Each opening 70 interrupts at least one lenticular lens 68. In an alternate embodiment, lenticular sheet 62 includes a plurality of smooth areas free of lenticular lenses 68. Each smooth area 70 interrupts at least one lenticular lens 68.

Figure 7:
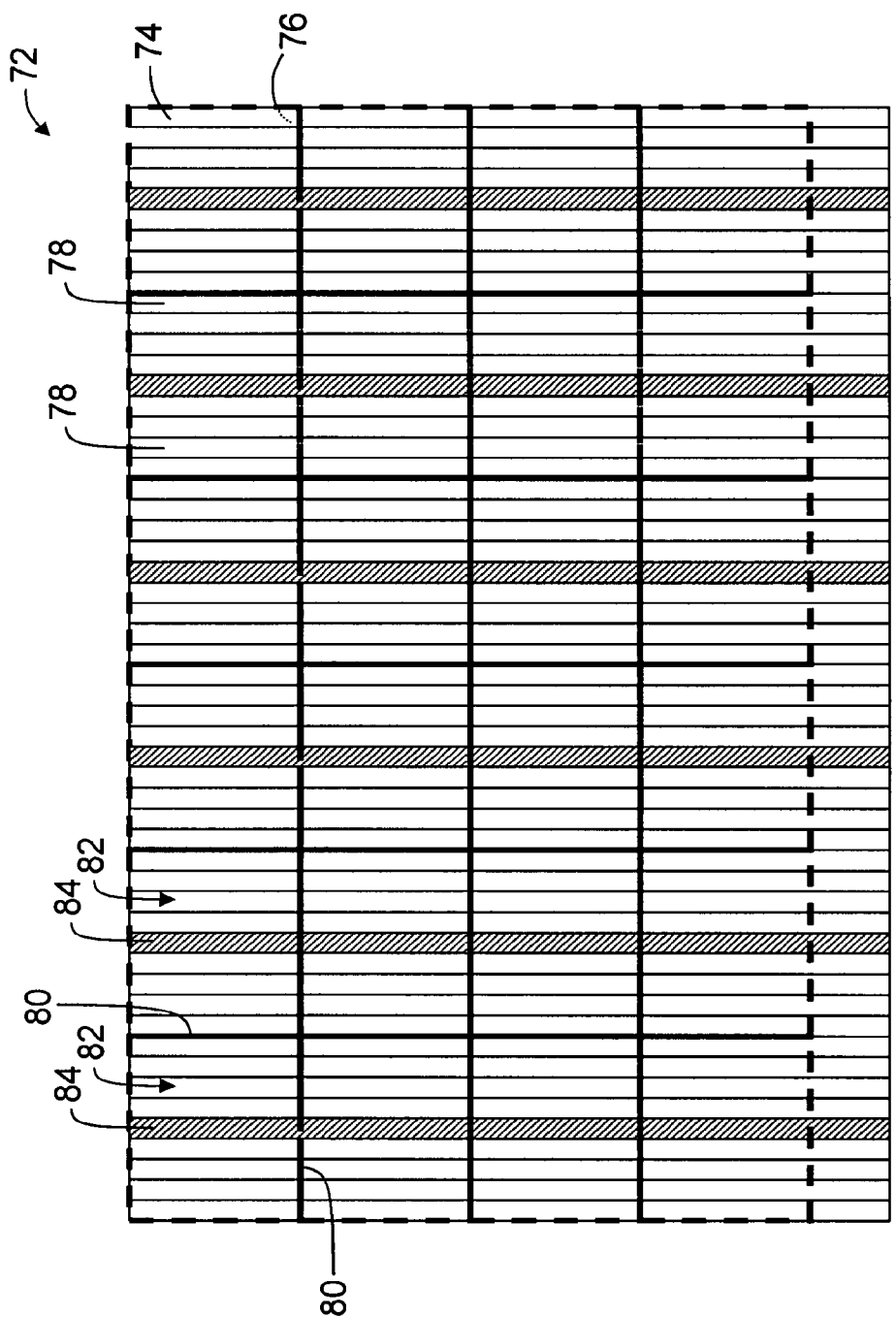
FIG. 7 is a face view schematic illustration of a lenticular sheet in accordance with another exemplary embodiment of the present invention.

FIG. 7 is a face view schematic illustration of a lenticular sheet 72 in accordance with another exemplary embodiment of the present invention. Lenticular sheet 72 has a first surface 74 and an opposing second surface 76. A plurality of lenticular lenses 78 are formed in first surface 74 of lenticular sheet 72. A plurality of intersecting score lines 80 define a plurality of articles 82 that are formed in lenticular sheet 72. Also, lenticular sheet 72 includes a plurality of hinge areas 84 with each article formed in lenticular sheet including a portion of hinge area 84. Hinge area 84 permits article 82 to be folded like, for example, a greeting card.

Figure 8:
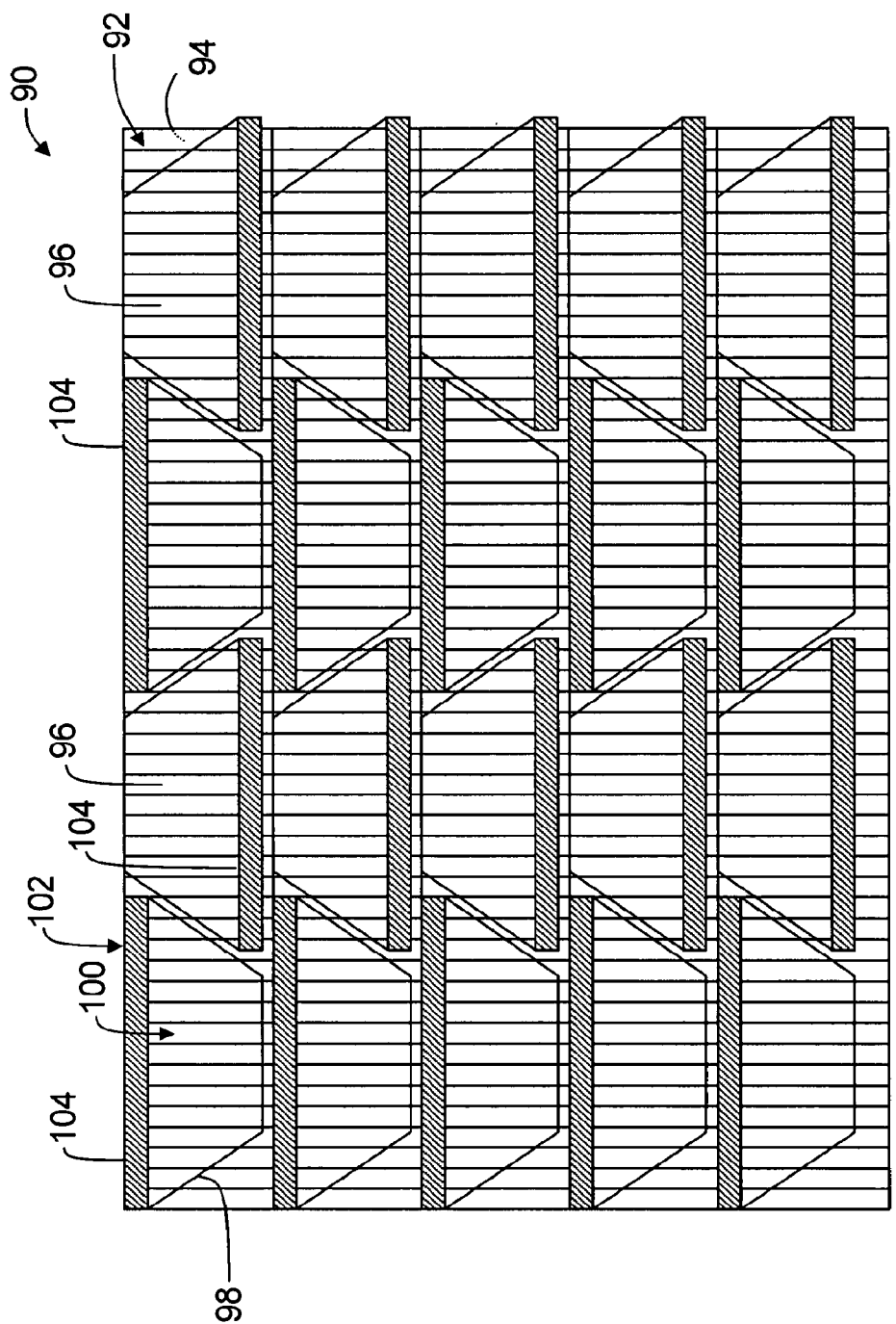
FIG. 8 is a face view schematic illustration of a lenticular sheet in accordance with another exemplary embodiment of the present invention.

FIG. 8 is a face view schematic illustration of a lenticular sheet 90 in accordance with another exemplary embodiment of the present invention. Lenticular sheet 90 has a first surface 92 and an opposing second surface 94. A plurality of lenticular lenses 96 are formed in first surface 92 of lenticular sheet 90. A plurality of score lines 98 define a plurality of articles 100 that are formed in lenticular sheet 90. Each article 100 includes a formed feature 102. In the exemplary embodiment, each article 100 includes a lip 104, with each article 100 formable into a cup. In alternate embodiments, formed feature 102 can be, for example, feet, stops, and/or a ledge.

Figure 9:
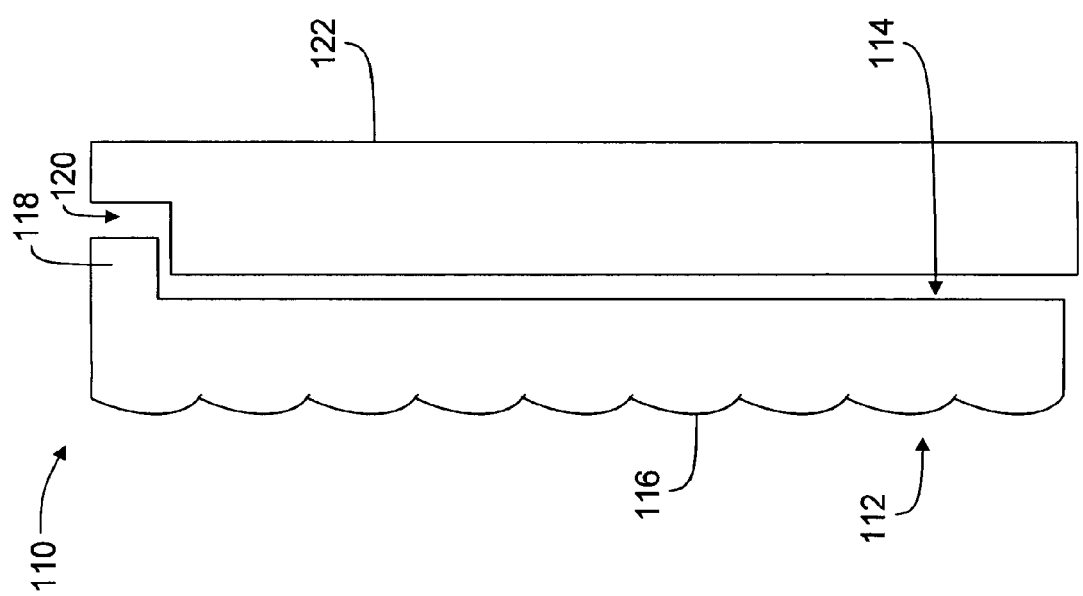
FIG. 9 is an edge view schematic illustration of a lenticular lens in accordance with another exemplary embodiment of the present invention.

FIG. 9 is an edge view schematic illustration of a lenticular sheet 110 in accordance with another exemplary embodiment of the present invention. Lenticular sheet 110 has a first surface 112 and an opposing second surface 114. A plurality of lenticular lenses 116 are formed in first surface 112 of lenticular sheet 110. An alignment ridge 118 extends from second surface 114 of lenticular sheet 110. Alignment ridge 118 is sized to be received in a notch 120 in an adjacent plastic sheet 122 to properly align lenticular sheet 110 and adjacent sheet 122.

Figure 10:
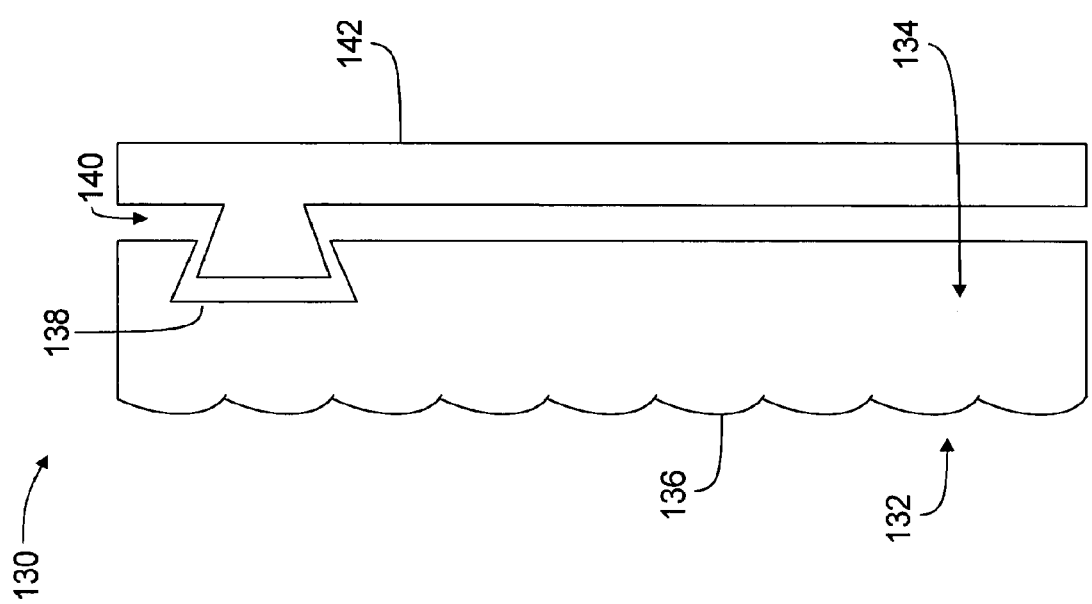
FIG. 10 is an edge view schematic illustration of a lenticular lens in accordance with another exemplary embodiment of the present invention.

FIG. 10 is an edge view schematic illustration of a lenticular sheet 130 in accordance with another exemplary embodiment of the present invention. Lenticular sheet 130 has a first surface 132 and an opposing second surface 134. A plurality of lenticular lenses 136 are formed in first surface 132 of lenticular sheet 130. A notch 138 extends into second surface 134 of lenticular sheet 130. Notch 138 is sized and shaped to receive a corresponding shaped mating protrusion 140 extending from an adjacent plastic sheet 142 in a snap-together arrangement to attach lenticular sheet 130 to adjacent sheet 142.

Figure 11:
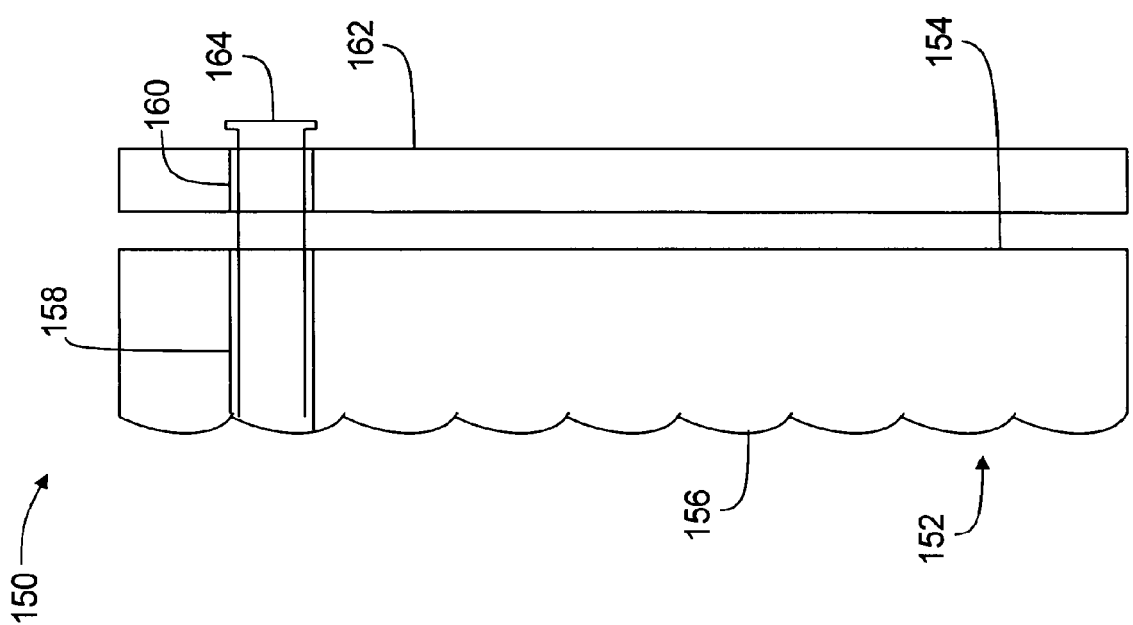
FIG. 11 is an edge view schematic illustration of a lenticular lens in accordance with another exemplary embodiment of the present invention.

FIG. 11 is an edge view schematic illustration of a lenticular sheet 150 in accordance with another exemplary embodiment of the present invention. Lenticular sheet 150 has a first surface 152 and an opposing second surface 154. A plurality of lenticular lenses 156 are formed in first surface 152 of lenticular sheet 150. A fastening hole 158 extends through lenticular sheet 150. Fastening hole 158 is sized and positioned to aligned with a corresponding fastening hole 160 extending through an adjacent plastic sheet 162. A fastener 164 extending through fastening holes 158 and 160 can be used to attach lenticular sheet 150 to adjacent sheet 162. Any suitable fasteners can be used, for example, screws, bolts, pins, rivets, and the like.

While the invention has been described in terms of various specific embodiments, those skilled in the art will recognize that the invention can be practiced with modification within the spirit and scope of the claims.

What is claimed is:

1. A lenticular sheet comprising:
    at least one lenticular lens defined on a first surface of said lenticular sheet;
    at least one alignment ridge extending from a second surface of said lenticular sheet, said second surface opposing said first surface and being free of lenticular lenses; and
    at least one of:
        at least one score line;
        at least one opening extending through said sheet and interrupting at least one of said lenticular lens;
        at least one area free of said lenticular lenses on said first surface and interrupting at least one of said lenticular lenses on said first surface;
        at least one of a lip, a foot, a stop, and a ledge, wherein said at least one of said lip, said foot, said stop, and said ledge extend from said first surface of said lenticular sheet; and
        at least one hinge area.

2. The lenticular sheet in accordance with claim 1 wherein said at least one score line comprises a plurality of intersecting score lines.

3. The lenticular sheet in accordance with claim 2 wherein said intersecting score lines define a plurality of articles, each said article including a portion of said at least one hinge area.

4. The lenticular sheet in accordance with claim 3 wherein each said article further comprises said at least one of said lip, said foot, said stop, and said ledge.

5. The lenticular sheet in accordance with claim 1 further comprising at least two portions, a first sheet portion having a thickness different from a thickness of an adjacent second sheet portion.

6. The lenticular sheet in accordance with claim 1 further comprising at least two patterns of lenticular lenses.

7. The lenticular sheet in accordance with claim 1 comprising said at least one score line and said at least one area free of said lenticular lens.

8. The lenticular sheet in accordance with claim 1 further comprising a functionality feature, said functionality feature comprising at least one of alignment ridges, snap together elements, and joining elements.

9. The lenticular sheet in accordance with claim 1 further comprising glass or a thermoplastic material, said thermoplastic material selected from the group consisting of polyester resins, acrylic resins, polycarbonate resins, olefin resins, styrene resins, polylactic acid resins, polyhydroxyalkonoate resins, aliphatic aromatic polyester resins, and mixtures thereof.

10. A lenticular sheet comprising:
    at least one pattern of lenticular lenses defined on a first surface of said lenticular sheet;
    at least one alignment ridge extending from a second surface of said lenticular sheet, said second surface opposing said first surface and being free of a lenticular lens pattern; and
    at least one of:
        at least one score line;
        at least one opening extending through said sheet and interrupting at least one of said lenticular lens;
        at least one area free of said lenticular lens pattern on said first surface and interrupting at least one of said lenticular lens pattern on said first surface;
        at least one of a lip, a foot, a stop, and a ledge, wherein said at least one of said lip, said foot, said stop, and said ledge extend from said first surface of said lenticular sheet; and
        at least one hinge area on said first surface.

11. The lenticular sheet in accordance with claim 10 wherein said at least one score line comprise a plurality of intersecting score lines, wherein said intersecting score lines define a plurality of articles, each said article including a portion of said at least one hinge area.

12. The lenticular sheet in accordance with claim 10 further comprising at least two portions, a first sheet portion having a thickness different from a thickness of an adjacent second sheet portion.

13. The lenticular sheet in accordance with claim 10 comprising said at least one score line and said at least one area free of said lenticular lens pattern.

14. A method of manufacturing a lenticular sheet comprising the steps of:
    providing a substrate sheet, the substrate sheet having a first surface and an opposing second surface;
    forming at least one lenticular lens pattern in the first surface of the substrate sheet by contacting the first surface of the substrate sheet with an embossing device having a negative pattern of said at least one lenticular lens pattern;
    forming at least one alignment ridge extending from the second surface of the substrate sheet, the second surface being free of said at least one lenticular lens pattern; and
    forming at least one of:
        at least one score line;
        at least one opening extending through the sheet and interrupting said at least one lenticular lens pattern;
        at least one area free of said at least one lenticular lens pattern on the first surface of the substrate sheet and interrupting said at least one lenticular lens pattern on the first surface;

at least one of a lip, a foot, a stop, and a ledge, wherein the at least one of the lip, the foot, the stop, and the ledge extend from the first surface of the substrate sheet; and at least one hinge area on the first surface of the substrate sheet.

15. The method in accordance with claim 14 wherein said forming at least one score line comprises forming a plurality of intersecting score lines.

16. The method in accordance with claim 15 wherein the intersecting score lines define a plurality of articles, said forming at least one of step comprises forming the at least one hinge area, each said article including a portion of the at least one hinge area.

17. The method in accordance with claim 16 wherein said forming at least one of step comprises forming the at least one of the lip, the foot, the stop, and the ledge formed in each said article.

18. The method in accordance with claim 15 further comprising forming at least two sheet portions, a first sheet portion having a thickness different from a thickness of an adjacent second sheet portion.

19. The method in accordance with claim 15 further comprising forming a functionality feature, the functionality feature comprising at least one of alignment ridges, snap together elements, and joining elements.

20. A lenticular lens embossing device configured to emboss a pattern on a first surface of a sheet, the sheet including a second surface opposing the first surface, said device comprising:

an engagement member having an outer surface; and a negative of at least one lenticular lens pattern on said outer surface of said engagement member, the negative configured to form the at least one lenticular lens pattern in the first surface of the sheet;

wherein said engagement member comprises:

at least one projection configured to form at least one alignment ridge that extends from the second surface of the sheet, wherein the second surface is free of the at least one lenticular lens pattern; and at least one of:

at least one projection configured to form at least one score line through the sheet;

at least one projection configured to form a plurality of hinge areas on the first surface of the sheet;

at least one projection configured to form at least one opening extending through the sheet, each said opening interrupting the at least one lenticular lens pattern; and at least one projection configured to form at least one of a lip, a foot, a stop, and a ledge, wherein said at least one of said lip, said foot, said stop, and said ledge extend from the first surface of the sheet.

21. The device in accordance with claim 20 wherein said outer surface of said engagement member comprising a plurality of projections configured to form a plurality of intersecting score lines.

22. The device in accordance with claim 20 wherein said engagement member is configured to form at least two portions in the sheet, a first sheet portion having a thickness different from a thickness of an adjacent second sheet portion.

23. The device in accordance with claim 20 wherein said outer surface of said engagement member is further configured to form at least one area free of the at least one lenticular lens pattern on the first surface of the sheet and interrupting the at least one lenticular lens pattern on the first surface.

24. The device in accordance with claim 20 wherein said outer surface of said engagement member comprises at least one projection configured to form a functionality feature, said functionality feature comprising at least one of alignment ridges, snap together elements, and joining elements.

25. A lenticular sheet assembly comprising:

a first sheet having a first end and an opposing second end, the first sheet further having a first surface and an opposing second surface, each of the first surface and the second surface extending between the first end and the second end, the first surface and the second surface each being substantially flat, the first sheet comprising a notch defined in the first surface at the first end of the first sheet; and a second sheet having a first end and an opposing second end, the second sheet further having a first surface and an opposing second surface, each of the first surface and the second surface extending between the first end and the second end, the second surface of the second sheet being adjacent to the first surface of the first sheet such that the first end of the second sheet is adjacent to the first end of the first sheet, the second sheet comprising:

a lenticular lens pattern defined on the first surface of the second sheet, wherein the second surface of the second sheet is free of lenticular lens patterns; and an alignment ridge extending from the second surface of the second sheet, the alignment ridge being received in the notch defined in the first sheet to align the second sheet with the first sheet.

26. The lenticular sheet assembly in accordance with claim 25 wherein the second sheet further comprises at least one of:

at least one score line;

at least one opening extending through the second sheet and interrupting the lenticular lens pattern;

at least one area free of the lenticular lens pattern on the first surface of the second sheet and interrupting the lenticular lens pattern on the first surface;

at least one of a lip, a foot, a stop, and a ledge, wherein the at least one of the lip, the foot, the stop, and the ledge extend from the first surface of the second sheet; and at least one hinge area.

27. The lenticular sheet assembly in accordance with claim 25 wherein the first sheet is a plastic sheet.

* * * * *